US008499167B2

(12) United States Patent
Malanov

(10) Patent No.: US 8,499,167 B2
(45) Date of Patent: Jul. 30, 2013

(54) SYSTEM AND METHOD FOR EFFICIENT AND ACCURATE COMPARISON OF SOFTWARE ITEMS

(75) Inventor: Aleksey Malanov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 449 days.

(21) Appl. No.: 12/632,376

(22) Filed: Dec. 7, 2009

(65) Prior Publication Data

US 2011/0083187 A1    Apr. 7, 2011

(30) Foreign Application Priority Data

Oct. 1, 2009 (RU) ................................. 2009136236

(51) Int. Cl.
*G06F 7/04* (2006.01)
*H04L 9/00* (2006.01)

(52) U.S. Cl.
USPC ............. 713/187; 713/188; 713/189; 726/24; 726/25; 726/26

(58) Field of Classification Search
USPC ....................................................... 713/187
See application file for complete search history.

(56) References Cited

U.S. PATENT DOCUMENTS

| | | | |
|---|---|---|---|
| 4,807,182 A | 2/1989 | Queen | |
| 5,878,050 A | 3/1999 | Brahme et al. | |
| 5,995,982 A | 11/1999 | Mercer | |
| 6,021,491 A | 2/2000 | Renaud | |
| 6,526,574 B1 | 2/2003 | Jones | |
| 6,738,515 B1 | 5/2004 | Akagi | |
| 6,738,932 B1 | 5/2004 | Price | |
| 6,990,600 B2 | 1/2006 | Ryan et al. | |
| 7,447,703 B2 | 11/2008 | Jameson | |
| 2006/0218637 A1 | 9/2006 | Thomas et al. | |
| 2007/0260651 A1 | 11/2007 | Pedersen | |
| 2008/0052644 A1 | 2/2008 | Ashar et al. | |
| 2008/0065639 A1 | 3/2008 | Choudhary et al. | |
| 2008/0162748 A1 * | 7/2008 | Fanning | 710/52 |
| 2008/0229419 A1 | 9/2008 | Holostov et al. | |
| 2008/0256631 A1 | 10/2008 | Zvi | |

(Continued)

FOREIGN PATENT DOCUMENTS

GB    WO 2008/009991 A1 *  1/2008

OTHER PUBLICATIONS

Brin et al., "Copy Detection Mechanisms for Digital Documents", Department of Computer Science. Stanford University. Stanford, CA. 1995.

(Continued)

*Primary Examiner* — Longbit Chai
(74) *Attorney, Agent, or Firm* — Patterson Thuente Pedersen, P.A.

(57) ABSTRACT

Apparatus, processes, and related technologies for comparison between a target item of software code and a reference set of software code. The target item is preprocessed to be compared against a reference item from the reference set to identify a selected set of lines of software code from the target item to be used for the comparison. Each line of the selected set of lines from the target software item is individually compared with lines of software code from the reference set to produce a measure of similarity between the target software item and at least one reference item of software code from the reference set. Various techniques for maintaining and updating a numerical representation of similarity of the target item with each reference item, the numerical representation being stored in a corresponding element of a data structure.

20 Claims, 11 Drawing Sheets

U.S. PATENT DOCUMENTS

2008/0256636 A1 10/2008 Gassoway
2009/0013405 A1 1/2009 Schipka
2009/0077544 A1 3/2009 Wu
2009/0138967 A1 5/2009 Faieta et al.
2009/0158434 A1 6/2009 Yoo

OTHER PUBLICATIONS

Hunt et al, "An Algorithm for Differential File Comparison", 1976.

Maria, Biryukov, Presentation: "Perceptual Hashing of Textual Content" University of Luxembourg. http://wiki.uni.lu/mine/Maria+Biryukov.html 2007.

Software Updates: Chromium Developer Documentation. Software Updates: Courgette. 4 pages. Jul. 16, 2009.

Matching with Mismatches and Assorted Applications. Colin Percival Wadham College. University of Oxford. A thesis submitted for the degree of Doctor of Philosophy. Hilary 2006. 82 pages.

\* cited by examiner

Infected File

Infected File

Clean File

Infected File        Clean File

| File1ID | Hash1 |
|---------|-------|
|         | Hash2 |
|         | ...   |
|         | HashN |
| File2ID | Hash7 |
|         | Hash12|
|         | ...   |
|         | HashK |

Files-Hashes

FIG. 6A

| Hash1 | File1ID |
|-------|---------|
|       | FileLID |
|       | ...     |
| Hash2 | File1ID |
|       | ...     |
| ...   |         |
| HashN | File2ID |
|       | ...     |

Hashes-Files

FIG. 6B

SYSTEM AND METHOD FOR EFFICIENT AND ACCURATE COMPARISON OF SOFTWARE ITEMS

FOREIGN PRIORITY

This Application claims priority to Russian patent application No. 2009136236, filed Oct. 1, 2009, and entitled "Method for Comparing an Unknown File to a Collection of Files Based on a Degree of Similarity."

FIELD OF THE INVENTION

The invention relates generally to computing and information processing. More specifically, this invention relates to systems and methods for the efficient comparison of files line-by-line to determine their similarity or non-similarity.

BACKGROUND OF THE INVENTION

Harmful computer programs such as viruses, spyware, malware and others have been prevalent in the computing industry since at least the early 1970's. With each iteration in the development cycle of computer hardware and software, these harmful programs developed as well. The early harmful programs were somewhat more controllable, as system administrators could guard the limited entry points into their computers and computer networks. However, with the advent of the interne and the greater movement towards hyper-connectivity the task of guarding against the various harmful programs became a priority for both enterprise and consumer users.

Several companies, including Kaspersky, Symantec, McAfee, Panda, and Eset, created programs aimed at providing solutions to the problem of harmful programs. Several other programs were tailored to be attachments or plugins to specific network hardware devices or software packages, for example Upload Processor from MSmac Software was an application for uploading attachments to bulletin boards that would perform a virus scan of any identified upload before performing the transaction.

Although programs were developed to thwart and protect against known types of threats, the next wave of harmful programs were more advanced and were able to work around some of the detection and protection mechanisms put in place. These initial adaptations signaled the beginning of an "arms race" in computer protection. Security firms are now locked in a race to protect against the rapidly maturing and developing world of harmful software. Each year this race becomes more and more relevant as the world becomes increasingly reliant on computer systems and infrastructure. It is estimated that harmful computer programs cause billions of dollars in damages each year. Further, cyberattacks and other forms of cyberwarfare utilizing harmful computer programs are major considerations in the defense and protection of various countries around the world.

One of the principle challenges in the development of protection and detection software is how to reduce false positives, which occur when a program or process is labeled as harmful when it actually isn't; and false negatives, which occur when a program or process is deemed safe when it is actually harmful. The false-positives and false-negatives directly impact the overall success rate of the product and directly impact computer systems and functionality. False positives effectively prevent a user from utilizing legitimate software in their systems. Thus, too many false positives can greatly impact the normal workflow operations of businesses and individuals alike and result in a switch to a different program for protection and detection, or even an abandonment of the protection and detection software altogether by users. The abandonment of the protection and detection software is of particular concern in the present day as it opens the door for many types of attacks including those that turn the user's computer into a "bot," or "drone" of harmful activity that spreads worms or attacks other machines on its network or on the Internet.

False negatives are equally problematic in that the user will not be warned of a harmful program and/or will not have the option to prevent the program from executing. The result may be devastating, as the computer user believes they are protected from harmful programs which are, in fact, potentially executing on their machines. These "protected" computers may then also become bots or drones, proliferating harmful activity.

In both the false positive and false negative situations, there remains the possibility of the additional costs of lost productivity, lost information and information exploitation as a result of the actions of the harmful programs. These additional costs have both immediate ramifications and potential to require businesses and individuals to make significant changes in their daily operations. Thus, many software suppliers offer appliances and applications that aim to reduce the false designations. However, these offerings have proven to be inefficient in providing protection due to long processing times as a result of overly complex algorithms, inaccurate detection methodologies and short lifespan due to lack of flexibility in addressing new threats.

Thus, a need exists for a fast, efficient and accurate method to detect harmful software that is able to adapt to the continually changing face of computer protection.

SUMMARY OF THE INVENTION

Aspects of the present invention substantially addresses limitations of existing methods of determining similarity of unknown, or target items of software, to previously analyzed, known, or more generally, to reference items of software (such as malicious or harmful software, or known benign software, for example). Efficient techniques and apparatus are described in detail below that compare software items to determine incidence of entire lines of software code of the target software items in the reference items of software. The techniques of the present invention increase comparison performance maintaining flexibility in adapting to variability in software structure and information content.

According to one aspect of the invention, a machine-implemented process for performing a comparison between a target item of software code and a reference set of at least one reference item of software code is provided. It should be understood that each of the target item or reference items of software can be in the form of files stored in a file system of a computer, or each can be portion of a file, or can span multiple files.

According to this process, the target item is preprocessed by a data processing machine, such as a computer system, for example, prior to executing the comparison operations. The preprocessing includes automatically analyzing the target item for a presence of any lines of software code that tend to reduce sensitivity of the comparison, and selecting a relevant set of lines of software code from a remaining portion of the target item to be used for the comparison.

In various embodiments, software code that tends to reduce the sensitivity of comparison may include a variety of instructions or data that are determined to have little or no effect on the unique functionality of the target item of software. For example, the preprocessing can be adapted to identify metadata generated during compilation of the software code, comments in source code, program header information, or header application stubs, which do not provide a functional effect in the operation of the target item. In another example, the preprocessing can be adapted to identify well-known portions of functional software code that are generated from the use of standard programming libraries or well-known functions or objects. Thus, in the context of the same example, when comparing a target item against known reference items of benign software, for instance, the presence of standard library code in the target item of software may tend to increase the measure of similarity between the target and reference items that are likely to also have such standard content, thereby reducing the sensitivity of the comparison in detecting differences that may be attributable to malware infection in the target item of software. Preprocessing to identify such content can therefore improve performance of the comparison operation that will follow. It should be noted that the reference items of software may have already been separately preprocessed in the same manner, or in a different manner.

Each of the relevant set of lines from the target software item is individually compared with lines of software code from the reference set to produce a measure of similarity between the target software item and at least one reference item of software code from the reference set. The comparison can be performed using a data processing machine that is either the same data processing machine used to perform the preprocessing, or a different data processing machine altogether.

In a related aspect, the preprocessing of the target item further includes separately compressing each line of the relevant set of lines selected from the target software item using a compression algorithm, such as a hashing algorithm, to produce a compressed set of lines from the target item of software. In this case, each line of the compressed set of lines from the target software item is separately compared with compressed lines of software code from the reference set, with the compressed lines of software code from the reference set having been compressed using the same compression algorithm used in the preprocessing of the target item.

In another related aspect of the invention, a data structure is generated having elements corresponding to each reference item of the reference set. As each line of software code of the target software item is compared against the set of reference items, a numerical representation of similarity of the target item with each reference item is stored (or updated) in a corresponding element of the data structure.

In another aspect of the invention, apparatus for performing a comparison between a target item of software code and a reference set of at least one reference item of software code includes a computer system including at least one processor and a data store. The computer system includes a preprocessing module, a comparison module, and an output data store. Each of the modules is either implemented as computer hardware, or as a combination of hardware and software that establishes operation of the hardware.

The preprocessing module is adapted to preprocess the target item to be compared against a reference item from the reference set to identify a selected set of lines of software code from the target item to be used for the comparison. The comparison module is adapted to individually compare each line of the selected set of lines from the target software item with lines of software code from the reference set to produce a measure of similarity between the target software item and at least one reference item of software code from the reference set. The output data store is adapted to store a data structure having elements corresponding to each reference item of the reference set. A numerical representation of similarity of the target item with each reference item is stored in a corresponding element of the data structure.

A number of advantages can be realized utilizing various embodiments of the invention such as, for example, quicker detection of harmful programs before they execute on a computer system. Additionally, benefits provided by aspects of the invention may include a lower false-positive and false-negative determination rate as compared to conventional methods of file comparison present in the art. Further, various the implementations may enable the line-by-line comparison of two file collections, either known or unknown, to determine their similarity in an efficient manner. Other advantages will become apparent from the following description of aspects of the invention.

Various embodiments may utilize database tables, collections, arrays, hash-tables or other data structures to store the result of the preprocessing, or the result of the comparison, or both, in memory or in other storage media.

Certain embodiments utilize an indexing system such as item-hash or hash-item data structures or both, to store the reference items of software. The item-hash data structure may associate a particular item with several lines of each item of software that has been compressed by a hash function such as SHA-1, MD5, CRC32, or the like. The hash-item data structure may associate lines of various items of software that have been compressed by a hash function such as those exemplified above, to the various items of software that contain the lines.

Various embodiments determine the similarity of a target item of software to each of the reference items utilizing line-by-line comparison. These embodiments utilize the file-hash structure of the preprocessed item of software to take the first preprocessed line from the target item of software and query the reference data structure to look for items that have the same line as indicated by a matching hash value. After all reference items with the same line have been identified; the corresponding similarity value stored in the similarity data structure is incremented. This process continues until all preprocessed lines of the target item of software have been compared against the reference data structure. Thus, after completion, the similarity data structure has various values that collectively represent a measure of the target item's similarity to each of the reference items.

Thus, various embodiments facilitate efficient determination of similarity of unknown or target items of software to reference items, which then can be utilized for a variety of uses, such as to block harmful or malicious programs from entering or executing on a computer. In other embodiments, the determination of similarity may be utilized to determine the similarity of a collection of unknown files to a collection of identified files in an efficient manner. In these embodiments, the procedure outlined above would be executed for each file in the collection of unknown files.

BRIEF DESCRIPTION OF THE DRAWINGS

The invention may be more completely understood in consideration of the following detailed description of various embodiments of the invention in connection with the accompanying drawings, in which:

FIGS. 6A-6B are diagrams depicting tables that relate compressed representations of lines of software code contained in computer files with identifiers of those files according to one type of embodiment.

Figure 1:
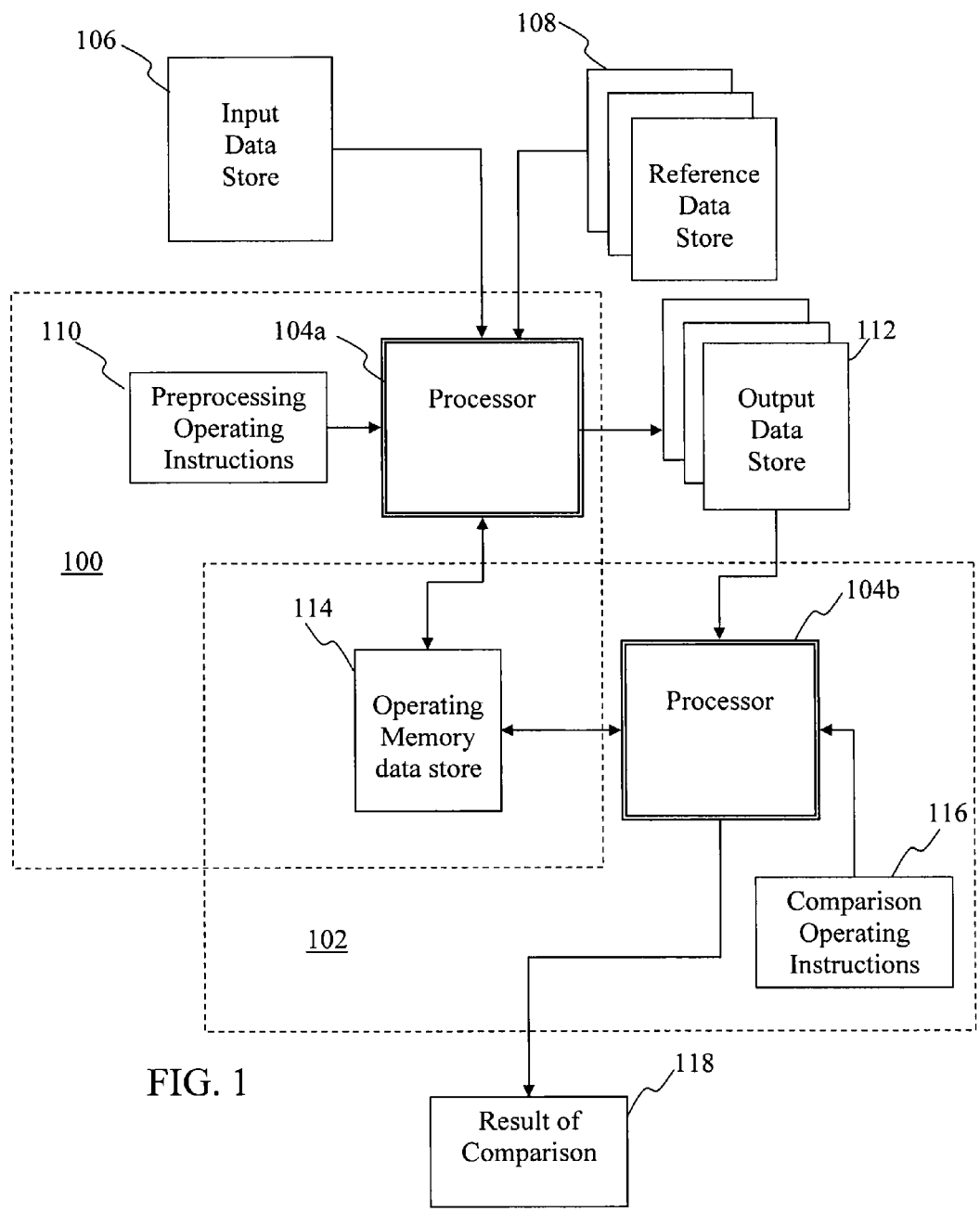
FIG. 1 s a block diagram illustrating a relatively high-level architecture of a computer system programmed to perform comparisons between target and reference software items according to one embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Introduction to Aspects of the Invention

Software programs are typically developed utilizing assembly code or high-level languages, and subsequently assembled or compiled into binary executable form. A variety of high-level programming languages such as JAVA®, Delphi, C, C++, C#, Perl®, Ruby®, Grails®, Python®, Visual Basic, and a myriad of others, or even a combination of different languages, may be utilized in creating source code and, ultimately, executable code for a program.

Aspects of the invention recognize that the functionality of programs, regardless of whether they exist as pre-compiled source code, runtime-executable code, or compiled executable code, such as portable executable code or machine code, generally consists as a series of individual instructions and arguments corresponding to instructions that are arranged in a line-by-line fashion. Each line of source code or executable code either constitutes a certain instruction, or corresponds to one or more instructions in some way. Accordingly, each line of a piece of software can be regarded in a general sense as an element of the software's functionality.

The same principle applies to malicious programs such as viruses, Trojans, keyloggers and other malware, which are also developed as pieces of software in which elements of functionality are represented line-by-line. These malicious programs may be developed from scratch, but sometimes they are altered legitimate or "original" programs that appear benign, but actually contain malicious code. In some cases, legitimate files are substantially modified by code being injected into the main body of the program. In other cases malicious code alters the initial portion of the file and intercepts all interactions with the legitimate file. Further, in the process of making a malicious program, a legitimate program may be decompiled from the binary executable, modified and recompiled or it may be altered in the binary state by a person having skill in the art that is able to navigate the binary signature and alter how the file is executed. However, an alteration of this type would affect the resultant decompilation of the program, thus altering certain lines of the line-by-line composition, but not others.

Aspects of the invention are directed to a line-by-line similarity analysis in which a software item of interest, referred to herein interchangeably as an unknown, or target software item, or target file, is compared to a reference software item (referred to herein interchangeably as a reference file or known or previously analyzed file) in an efficient manner utilizing line comparison. The various techniques can be applied in a variety of uses, including determining a level of security risk associated a target software item by comparing the target software item to known malicious software items, or known benign software items. A high degree of similarity of the target file and the known malicious file indicates a high probability of maliciousness while a low similarity indicates a benign or legitimate target file. The various techniques may be applied in areas other than computer security while still enjoying the benefits of efficiency provided by aspects of the invention.

Importantly, it should be understood that it is immaterial to the spirit of the invention as to where, or in what manner, the target software items and reference software items are stored or maintained. In various embodiments, software items may constitute files stored in the computer system's file system, or may be sets of data stored as part of one or more files, or loaded into RAM, a data buffer, or any other practical medium, whether local to the computer system, or located remotely, that is accessible to the processor of the computer system performing the similarity analysis.

The lines of the target or reference software items include a series of data symbols, such as bit sequences or strings, having a recognizable starting point and termination point. In the case of high-level program source code, lines may be terminated by a line feed character, and the start of each line is determinable either at the start of the software item or file, or following a line terminator. It should also be understood that line terminators may be explicit, as in the case with "\n" or "." character, or may be implicit, as in the case of fixed-length lines, or machine-executable code, where each instruction has a predefined number of bits (e.g., lines consisting of n bits in the case of machine code compiled to run on an n-bit processor).

Figure 2A:
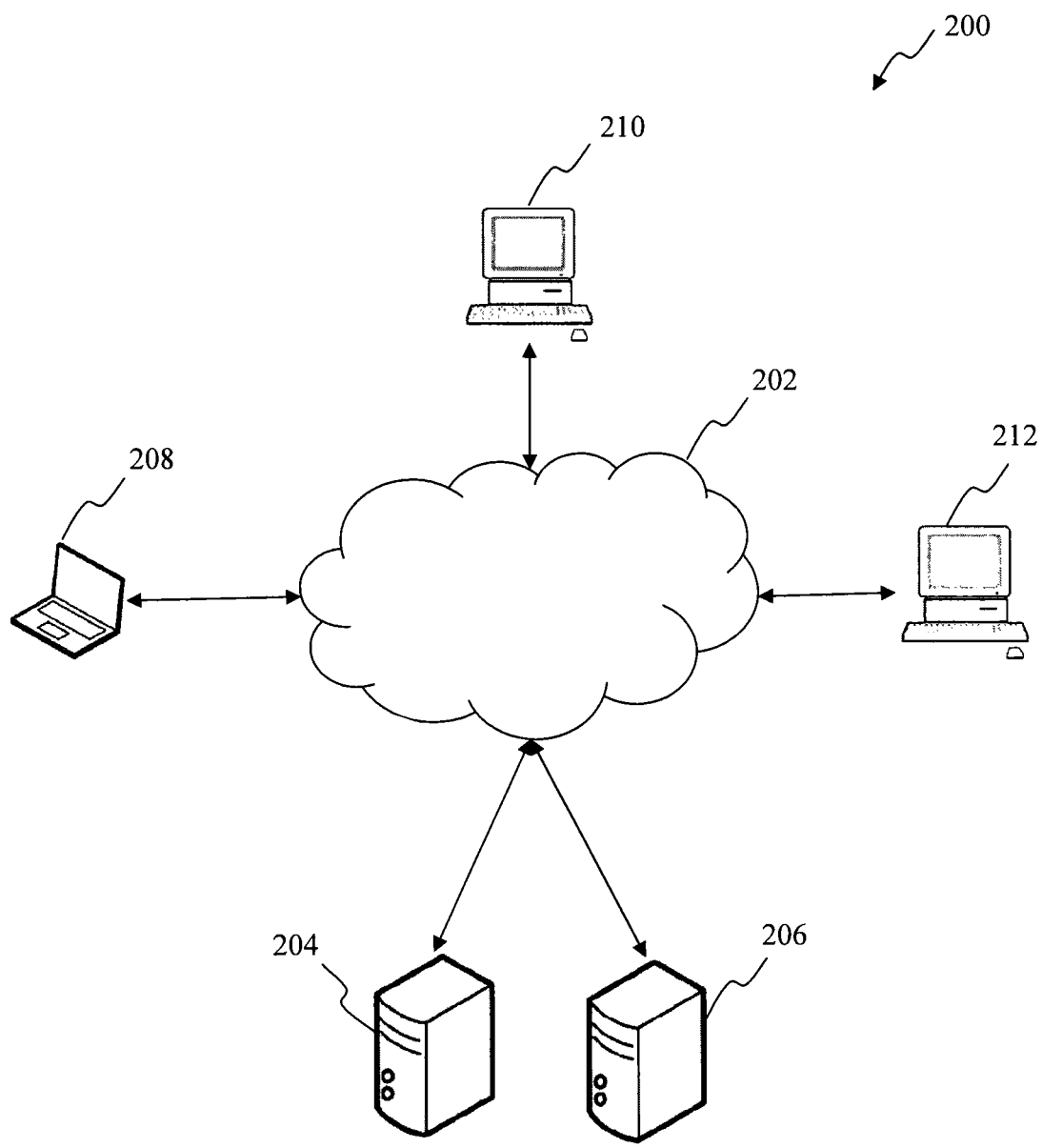
FIGS. 2A and 2B illustrate examples of network-implemented embodiments of carrying out the software item comparison system according to some aspects of the invention.
Figure 2B:
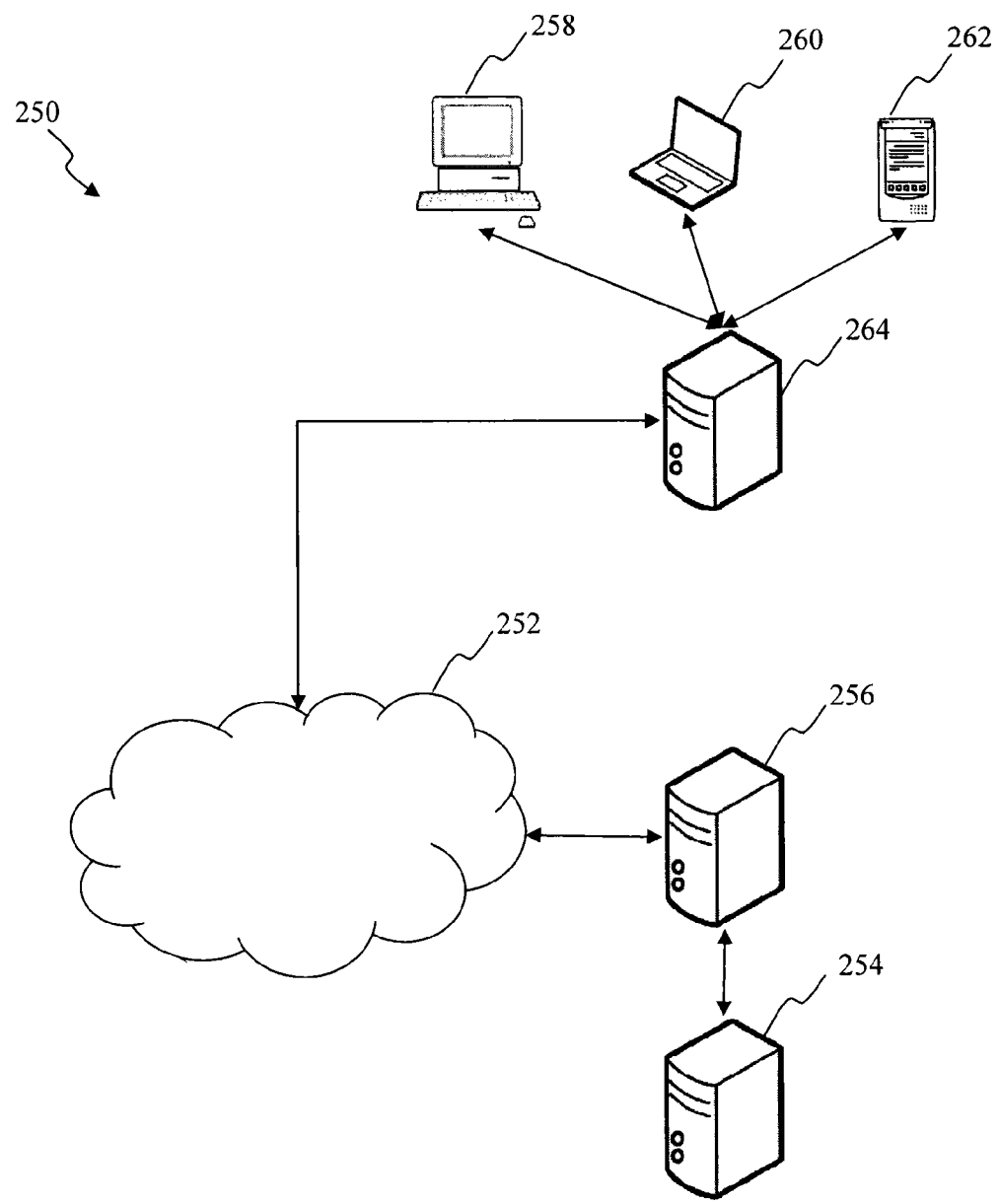
Figure 3:
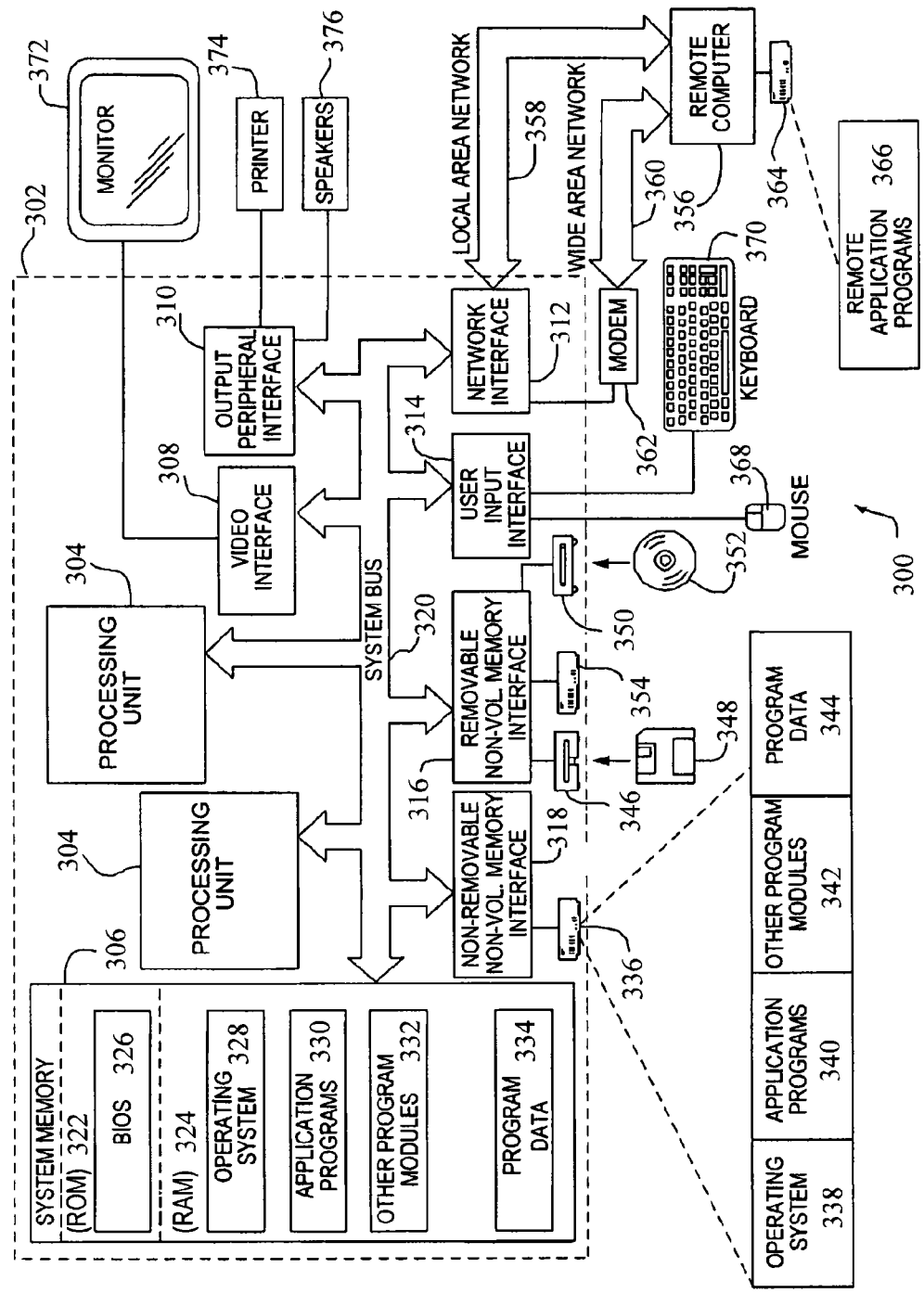
FIG. 3 is a diagram illustrating in greater detail a computer system on which aspects of the invention as described herein may be implemented according to various embodiments.

Examples of Computer Systems on Which Embodiments of the Invention may be Implemented Referring to FIGS. 1-3, various computer-based embodiments of systems for determining similarity between files utilizing line-by-line analysis are described. FIG. 1 illustrates a relatively high-level architecture of a computer system programmed to perform comparisons between target and reference software items according to one embodiment. The computer system includes preprocessing module 100 and comparison module 102, along with various data storage facilities described below, and other facilities that are not shown in FIG. 1 but that are described below in connection with FIG. 3, such as input/output, user interface, networking, and the like.

Each of the data storage facilities can be allocated in one, or a combination of, RAM, magnetic or optical disk, flash, or any suitable medium for storing data. Preprocessing module 100 includes processor 104a that is programmed to read input data store 106 (from which it obtains a target software item or items), and reference data store 108, from which one or more reference software items are read. Processor 104a reads preprocessing operating instructions from data store 110, and processes data according to those instructions. The output from processor 104a is written to output data store 112. Operating memory data store 114 is allocated for use as a temporary scratchpad memory during execution of the preprocessing instructions.

In general, preprocessing module 100 operates to arrange the target software item(s) and, if not already preprocessed, the reference software item(s) into a form or representation that facilitates more effective or efficient comparison. As will be detailed below, preprocessing that may be performed by preprocessing module 100 can include operations to format, convert, compress, or prune the data being preprocessed.

Comparison module 102 includes processor 104b that is configured to execute comparison operating instructions from data store 116. Processor 104b may also utilize Operating memory data store 114 during execution of the comparison operating instructions. Data store 118 is used to store the output of the comparison module 102. Comparison module 102 operates on preprocessed software items to render a comparison between at least one preprocessed target software item and at least one preprocessed reference software item.

In one type of embodiment, processor 104b and processor 104a are the same processor. In this regard, preprocessing module 100 and comparison module 102 can share at least some of their hardware. In a related embodiment, all of the hardware devices are common among both, the preprocessing module 100, and comparison module 102. Accordingly, in one type of embodiment, the computer system is implemented in a single computer system. In another type of embodiment, however, the system may be implemented utilizing a system of more than one distinct computer, communicatively coupled with one another.

FIGS. 2A and 2B illustrate examples of network-implemented embodiments of carrying out the software item comparison system according to some aspects of the invention. Turning first to FIG. 2A, system 200 utilizes a computer network 202, which can be the Internet, an application server 204, an administrative server 206 and client computers 208, 210 and 212.

The computer network 202 is utilized to provide interconnectivity between the application server 204, administrative server 206 and client computers 208, 210 and 212. In this way, the system 200 utilizes the computer network 202 as a platform to connect otherwise disconnected computers and computer networks and allows network capable devices to send and receive information and connect to programs and services made available.

The application server 204 may include a database component and an application/web server component. In this embodiment, client computers 208, 210 and 212 may connect to the application server 204 to obtain information relating to already identified known files. Further, the application servers may utilize database software such as MySQL®, Microsoft® SQLServer®, Oracle®, Postgres, Ingres®, hashfiles or a combination thereof, to store information relating to the files. In other embodiments the application server 204 is connected via a distributed network utilizing various architectures such as Client-Server, N-Tier, P2P, cloud or cluster. Further, application server 204 may be a standard desktop computer or may utilize high-end server hardware. A person having skill in the art will appreciate that the application server 204 will utilize hardware that is most appropriate for its load and performance requirements whether that be a the mini-ITX form factor, Extended ATX, blade or other configuration. Further, the servers may utilize Intel or AMD, or other processors, Double Data Rate (DDR) memory, Error Correcting memory (ECC), rotational or Solid State Disk (SSD) arrays and other hardware to ensure optimum performance and reliability in operation and storing of data. Further, the application server 204 may utilize enterprise-class software such as Linux®, Unix® or Windows® Server operating systems. Additional application server 204 may be utilized in load-balancing or cluster configurations in order to handle increased load and to maintain system performance as the number of requests to the application server 204 increase. In other embodiments, the application server 204 instructions are stored in the client computer's 208, 210 and 212 memory.

The administrative server 206 may be a server located at an external service provider or computer software provider. The administrative server 206 may validate client computer's 208, 210 and 212 license information when attempts are made to retrieve information relating to identified files from the application server 204. The administrative server 206 may be configured to utilize hardware and software similar to the application server 204 above. In one embodiment the administrative server 204 and the application server 204 may utilize the same hardware to which the client computers 208, 210 and 212 connect. In this way, the administrative server may operate to identify computers authorized to utilize the various embodiments disclosed herein.

Client computers 208, 210 and 212 may be personal desktop computers, personal laptops, netbooks, servers, UMPCs, smartphones such as the iPhone® from Apple® or Pre® from Palm® or other devices. In various embodiments, the client computers may utilize, Double Data Rate (DDR) memory, Error Correcting memory (ECC), rotational or Solid State Disks (SSD) to store the information relating to identified files. Client computers may utilize software such as Linux®, Unix® or Windows® or Apple® operating systems. Further, as disclosed above the client computers 208, 210 and 212 may utilize database software such as Microsoft Access, MySQL lite, SQL Server Express, IBM DBS Express, hash files or a combination thereof to store information relating to identified files in a lightweight structure allowing for fast retrieval of identified file information.

Now referring to FIG. 2B another embodiment of a system 250 for determining similarity between files utilizing line-by-line analysis is presented. This embodiment includes computer network 252, application server 254, administrative server 256, client computers 258, 260 and 262 and network appliance 264. In this embodiment, client computers 258, 260 and 262 operate on a Local Area Network (LAN). Further, the LAN may utilize a firewall, router, server or other network appliance 264 to filter access to network resources. In this embodiment the application server 254 may be embedded into the firewall router, sever or other network appliance 264. Further, the client computers 258, 260 and 262 may request identified file information from the local appliance 264. In other embodiments, communication with the application server 254 may be moderated by the administrative server 256. This way, access to identified files stored in the application server 254 may require authentication from the client computer 258, 260 and 262 to pass through the administrative server 256. In this way, access to identified file information can be secured.

In various embodiments, the client computers 258, 260 and 262 may be configured to run software applications developed in a variety of programming languages including JAVA®, Delphi, C, C++, C#, Perl®, Ruby®, Grails®, Python® and others. Thus, the methods for line-by-line comparisons may be implemented at least partially in a variety of programming languages and executed on client computers. In certain embodiments client computers 258, 260 and 262 utilize a TCP/IP link to connect to the application server 254 to obtain file information. In other embodiments, the client computers 258, 260 and 262 utilize a web service to obtain file information. The web service may utilize TCP/IP including HTTP and implement SOAP, or may utilize a RESTful architecture for queries and response. Further, the web service may be secured by utilizing secure web service technologies such as XML encryption, XML signatures, Secure Socket Layer (SSL), Transport Layer Security (TLS), Hypertext Transfer Protocol Secure (HTTPS) or HTTP Authentication. In this embodiment, client computers 258, 260 and 262 format messages containing requested file information and send it to the application server 254 which processes the message and returns the requested information.

FIG. 3 is a diagram illustrating in greater detail a computer system 300 on which aspects of the invention as described herein may be implemented according to various embodiments. The system 300 may include a computing device such as a personal computer 302. The personal computer 302 includes one or more processing units 304, a system memory 306, a video interface 308, an output peripheral interface 310, a network interface 312, a user input interface 314, removable 316 and non-removable 318 memory interfaces and a system bus or high-speed communications channel 320 coupling the various components. In various embodiments, the processing units 304 may have multiple logical cores that are able to process information stored on computer readable media such as the system memory 306 or memory attached to the removable 316 and non-removable 318 memory interfaces. The computer 302 system memory 306 may include non-volatile memory such as Read Only Memory (ROM) 322 or volatile memory such as Random Access Memory (RAM) 324. The ROM 322 may include a basic input/output system (BIOS) 326 to help communicate with the other portion of the computer 302. The RAM 324 may store portions of various software applications such as the operating system 328, application programs 330 and other program modules 332. Further, the RAM 324 may store other information such as program or application data 334. In various embodiments, the RAM 324 stores information that requires low-latencies and efficient access, such as programs and data being manipulated or operated on. In various embodiments RAM 324 comprises Double Data Rate (DDR) memory, Error Correcting memory (ECC) or other memory technologies with varying latencies and configurations such as RAMBUS or DDR2 and DDR3. In this way, in various embodiments, the system memory 306 may store the application information, identified file and target file information. Further, in various embodiments, the processing units 304 may be configured to execute instructions that limit access to the identified file and target information by requiring, for example, authentication, as well as perform line-by-line similarity analysis as described infra.

The removable 316 and non-removable 318 memory interfaces may couple the computer 302 to disk drives 336 such as SSD or rotational disk drives. These disk drives 336 may provide further storage for various software applications such as the operating system 338, application programs 340 and other program modules 342. Further, the disk drives 336 may store other information such as program or application data 344. In various embodiments, the disk drives 336 store information that doesn't require the same low-latencies as in other storage mediums. Further, the operating system 338, application program 340 data, program modules 342 and program or application data 344 may be the same information as that stored in the RAM 324 in various embodiments mentioned above or it may be different data potentially derivative of the RAM 324 stored data.

Further, the removable non-volatile memory interface 316 may couple the computer 302 to magnetic portable disk drives 346 that utilize magnetic media such as the floppy disk 348, Iomega® Zip or Jazz, or optical disk drives 350 that utilize optical media 352 for storage of computer readable media such as Blu-Ray®, DVD-R/RW, CD-R/RW and other similar formats. Still other embodiments utilize SSD or rotational disks housed in portable enclosures 354 to increase the capacity of removable memory.

The computer 302 may utilize the network interface 312 to communicate with one or more remote computers 356 over a local area network (LAN) 358 or a wide area network (WAN) 360. The network interface 312 may utilize a Network Interface Card (NIC) or other interface such as a modem 362 to enable communication. The modem 358 may enable communication over telephone lines, coaxial, fiber optic, or powerline. The remote computer 356 may contain a similar hardware and software configuration or may have a memory 364 that contains remote application programs 366 that may provide additional computer readable instructions to the computer 302. In various embodiments, the remote computer memory 364 can be utilized to store information such as identified file information that may be later downloaded to local system memory 306. Further, in various embodiments the remote computer may be the application server 254, administrative server 256, client computers 258, 260 and 262 or network appliance 264.

A user may enter in information to the computer 302 using input devices connected to the user input interface 314 such as a mouse 368 and keyboard 370. Additionally, the input device may be a trackpad, fingerprint scanner, joystick, barcode scanner, media scanner or the like. The video interface 308 may provide visual information to a display such as a monitor 372. The video interface 308 may be an embedded interface or it may be a discrete interface. Further, the computer may utilize plurality video interfaces 308, network interfaces 312 and removable 316 and non-removable 318 interfaces in order to increase the flexibility in operation of the computer 302. Further, various embodiments utilize several monitors 372 and several video interfaces 308 to vary the performance and capabilities of the computer 302. Other computer interfaces may be included in computer 302 such as the output peripheral interface 310. This interface may be coupled to a printer 374 or speakers 376 or other peripherals to provide additional functionality to the computer 302.

Various alternative configurations and implementations of the computer 302 are within the spirit of the invention. These variations may include, without limitation, additional interfaces coupled to the system bus 320 such as universal serial bus (USB), printer port, game port, PCI, PCI-X PCI Express or integrations of the various components described above into chipset components such as the northbridge or southbridge. For example, in various embodiments, the processing unit 304 may include a memory controller (not shown) to enable more efficient transfer of data from the system memory 306 than the system bus 320 may provide.

Examples of Algorithms that may be Implemented Computer Systems Such as Those Described Above According to one aspect of the invention, two program files may be determined to be similar if:

$$P(A \cap B) > P(A \Delta B),$$

where:

A∆B—a symmetrical difference in the sets
A∩B—the intersection of the sets
P(The X)—the cardinality of the set In other words, two files are similar if the number of lines that are present in both of the files exceeds the number of lines that are present in only one of the files. To further enumerate the concept, a level of similarity can be determined by utilizing the following relationship:

$$\text{similarity} = P(A \cap B) - P(A \Delta B) = P(A \cap B) - (P(A \backslash B) + P(B \backslash A)) = P(A \cap B) - (P(A) - P(A \cap B) + P(B) - P(A \cap B)) = 3*P(A \cap B) - P(A) - P(B) \quad (1)$$

Figure 4:
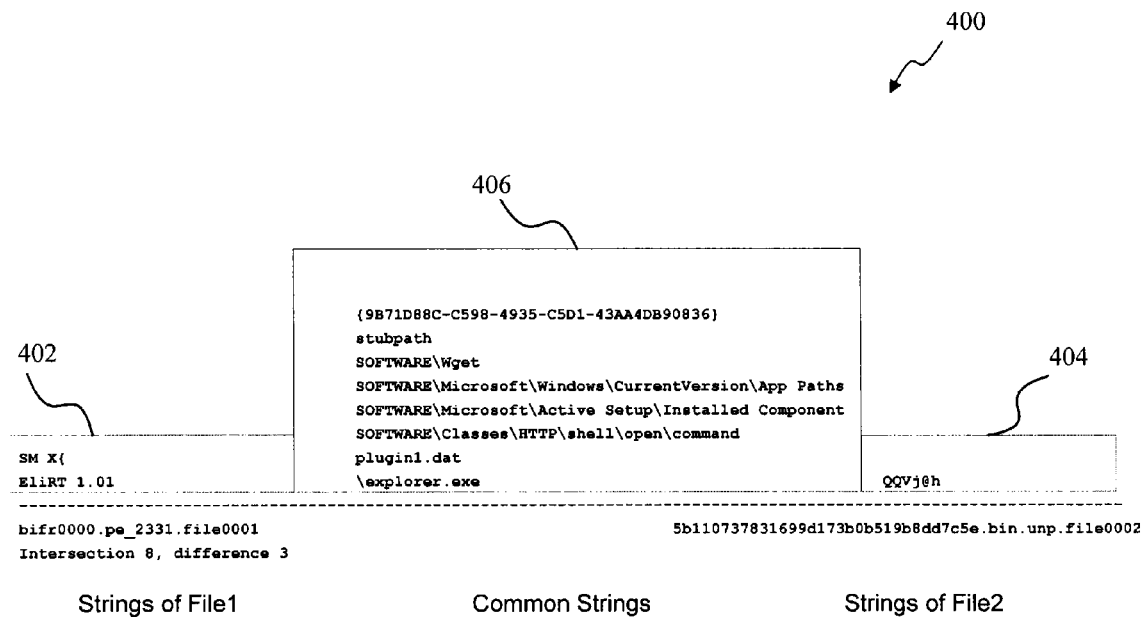
FIG. 4 is diagram depicting a basic technique for determining similarity according to one embodiment of the present invention.

A resultant positive value is an indication that the files are similar. A visual depiction of one embodiment of a determination of similarity is illustrated in FIG. 4. The result 400 after comparison of files indicates lines present only in the first file 402 and only in the second file 404. These lines can be compared with the lines common to both files 406. By utilizing the first line in equation (1) above, similarity is equal to the number common lines minus the number of lines that are not similar. Therefore, in this example the files are considered similar, as P(A∩B)−P(A∆B)=8−3=5. Since the number of lines similar minus the number of varying lines is greater than zero, the files are deemed to be similar.

In certain cases, determining similarity based on the number of similar lines as in the first line of equation (1) as disclosed above, may not be sufficient in determining the maliciousness of target files. The cases where a strict similarity approach may be problematic is exemplified in FIGS. 5A-5E. Referring to 5A, a target file 500 has been altered; however the alterations have only made minor changes to the file. Thus, if the target file is compared to a known "clean" file, utilizing the first algorithm above, the similarity would be positive due to the relatively minor changes in the file. The portion of the target file 500 that are clean 502 and 506 would be much greater than those that are infected 504. Thus, the number of lines that are the same as the identified file would be much greater than any differences, resulting in a determination that the file is clean. Often, files with such minor differences would be skipped by scanners and anti-virus programs in order to reduce the possibility of false-positives.

It should be noted that in various embodiments, the analyzed files are portable executable (PE) files. These files are common in windows operating systems and help define the operating parameters of the file. Thus, PE files may include a PE header with which the beginning and the length of the file can be determined by examining the PE header. In this way, by utilizing the PE header information a scanner can obtain additional file information which can then be leveraged in determining similarity.

Figure 5A:
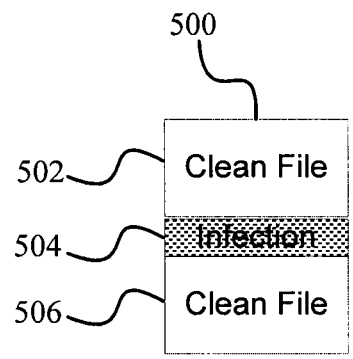
FIGS. 5A-5E are diagrams depicting examples of infected and clean computer file types stored in memory, which may be processed according to various embodiments of the invention.
Figure 5B:
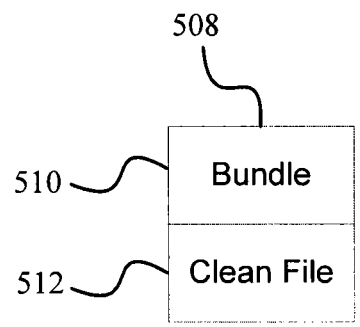
Figure 5C:
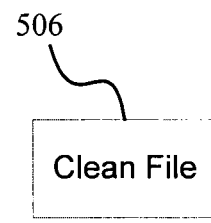
Figure 5D:
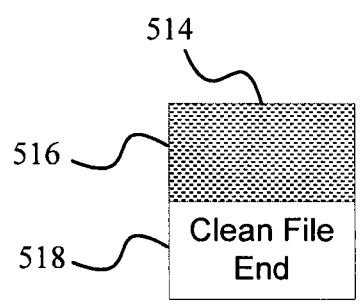
Figure 5E:
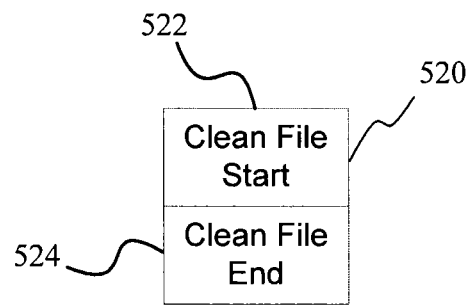

Another embodiment, shown in FIGS. 5B and 5C exhibit similar problems when utilizing the measure of similarity outlined above. In some situations a virus or malicious program will infect a clean file 506. The result of this infection is a modification of the original clean file 506 into an infected file 508 having a malicious portion 510 and the unaffected clean file portion 512. Often, in this situation, the file will appear normal to the end-user. The icons and filenames will appear as any other program or even the clean version; thus the end-user may execute the file without exercising caution even though the file contains a malicious payload.

Further, when a file is affected in this manner, the legitimate or clean portion of the file will often be executed after the malicious portion. In this way, the subterfuge is complete, i.e., the end-user sees a legitimate file and it executes as the legitimate file would. However, the malicious portion has also been executed as a result of the end-user's action. This configuration also leads to problematic determination utilizing the similarity equation disclosed above. It is possible that one could have an unknown target file that is clean 506. However, if this clean target file was compared to a known malicious file 508 which was configured with a malicious portion 510 and then the clean portion 512, the file would be determined similar due to the greater number of similar lines. Thus, this clean target file would be classified as malicious.

In various embodiments, a comparison of truncated files is implemented. A pre-execution comparison will examine the target file for the PE-file information, such as the PE-header, in addition to the overall file comparison. When the PE-file information is found by the scanner or process, the file is truncated and then compared with the known truncated malicious files. Thus, in this embodiment, clean file 506 will be compared with target file 508 first and then the target file 508 will be truncated and clean file 506 will be compared to the truncated malicious portion 510. In this situation, the truncated target file and clean file will not be highly similar because the truncated analysis will return little similarity.

A related type of embodiment addresses the situation depicted in 5D and 5E, where a malicious code overwrites a portion of a file 520, resulting in a target file 514 with a malicious portion 516 and a clean portion 518. In this situation, the target file 514 will appear similar to a legitimate file 520, which has a legitimate first 522 and second 524 portion. Further, in this situation, the normal function of the file being overwritten is destroyed and in cases where a PE-header is present, this information may be destroyed or overwritten as well.

In one such embodiment, a process similar to the one described above is utilized to determine similarity. A portion of the target file 518 may be truncated and compared against the legitimate file 520. In this embodiment, the target file 514 would not be truncated when the PE-header information is first determined; the target file 514 would be truncated at the end of the initial PE-file as determined in the header, if available. This would result in the malicious portion 516 being compared to the legitimate file 520. As a result of this comparison, the files would not be determined as being similar.

While the determination of similarity described in the first line of equation (1) above is sufficient in determining the similarity between files in certain situations, it may be insufficient in others. Thus, in order to further reduce the number of false-positives and false-negatives and increase the efficiency of determining similarity utilizing line-by-line comparisons, various other embodiments of the invention utilize phased matching.

Phased matching, according to these embodiments, determines the similarity of files, on a line-by-line basis, in phases. These phases include preprocessing, building and accessing a database of file information, and searching for and identifying similar files. In various related embodiments, there may be additional steps such as database optimization or data caching in order to further increase performance and efficiency.

In certain embodiments, the operation of phased matching may be altered utilizing configuration variables that may alter the execution of the phases. For example, configuration variables may alter how many hardware resources such as memory or clock cycles are devoted to phased matching.

In related embodiments, phased matching is implemented on multi-core processors; thus configuration files may determine how many cores to utilize, and in some embodiments, how many threads to execute on each core. The configuration files may be utilized to alter the location of the database such as a local directory or a remote directory on a network. The configuration files may indicate a timeout, or expiration of data within the database. The configuration files may be text files utilizing name-value pairs, text/xml files, or a database table that stores the configuration information or take any suitable form currently known in the art, or later developed.

Preprocessing, according to various embodiments, analyzes the files and extracts relevant lines therefrom to be further processed in later phases. In various embodiments, the preprocessing phase may be performed by a stand-alone computer system, an application server, client computer, or other computer having a data store capable of storing preprocessed file information.

According to various embodiments, preprocessing may include parsing a file line-by-line and evaluating its contents against a set of comparisons or standards, and extracting the lines that meet the requirements. For example, lines can be extracted if: string characters adhere to standard code library conventions (C, C++, Java and similar), lines are longer than four characters, lines end with \0, \r, \n or end of file (EOF). In various embodiments further criteria may be employed such examining for the presence of UNICODE or ASCII characters.

In some cases, the files to be compared are received in a packed, or compressed state. In these situations, in order to preprocess the files, the files are first unpacked or de-compressed prior to analysis. In various embodiments, the files are unpacked utilizing an anti-virus engine's unpacker. Anti-virus engines such as Symantec, McAfee, Eset, Kaspersky and others contain unpackers that enable the scanning of files for virus information. Other embodiments utilize an emulation engine to execute files in a contained space, thereby obtaining executable code corresponding to the file, stored in memory in the emulation space. Others embodiments make use of memory partitioning, and others still may utilize third-party packing and packaging utilities such as ASPack or diPacker to unpack the files for analysis.

Additional restrictions or exceptions may be added within the spirit of the invention in order to make the process more efficient in extracting the lines of a target file that provide the main functionality of the file. For example, not all lines in the target file will provide functional aspects to the file itself and thus additional restrictions or exceptions may be added to the preprocessing stage to remove these lines. For instance, many lines of compiled DELPHI code may be devoted to DELPHI maintenance operations or compilation, and not to the functions of the file. This is true for other compiled languages such as C, C++, Java and the others mentioned above which may have several lines in a file that are compilation-related metadata or artifacts.

In other instances, several lines of a target file may be non-functional documentation. Further, packing and packaging utilities may add lines of code to the target file, which may provide functionality to the packing or packaging utility, but not to the functionality of the program itself Restrictions or exceptions of this type may be predetermined manually by a file analyst that recognizes similarities in files, and added to a library of preconfigured rules that identify benign content for automatic detection of such content. For example, an analyst may identify similar lines in files created by the same packing utility or the same packing utility but different versions.

Alternatively, the phased matching process may include an automatic analysis portion that operates to recognize lines added by various packaging or packing utilities and versions, based on the preconfigured rules. Other restrictions or exceptions include headers added by ZIP, RAR or other compression utilities, common imported libraries in C, C++, Java and other languages, lines with names of common imported functions. The preprocessed lines that fall under the restriction or exception list are ignored and are not extracted for further analysis.

In another type of preprocessing, according to one type of embodiment, a compression algorithm or a hash function (such as CRC32, SHA-1 or MD5, for example) is applied to each line subject to comparison in order to increase the performance of the comparison operations and facilitate more efficient storage of those lines.

Now referring to FIGS. 6A and 6B the phase of building and accessing a database of file information according to one type of embodiment is presented. In various related embodiments, the building and accessing of a database may be performed by a stand-alone computer system, or by an application server, client computer, or other computer having a memory capable of generating the file information. After the file is processed line-by-line, the extracted relevant lines and their associated hashes are entered into a database. The line hashes created in the preprocessing stage are inserted into an array that utilizes a file ID such as filename and then stores the associated hashes in as file-hashes relationships 600 as shown in FIG. 6A.

In various related embodiments, these file-hashes relationships 600 allow for the efficient recovery of each item of functionality corresponding to an extracted line of a file. For example, a file having a file ID of File1ID might have lines indentified in Hash1, Hash2 ... HashN and a file with file ID File2ID might have lines indentified with Hash7, Hash12 ... HashK.

Further, various related embodiments create a database of file information that utilizes the line hashes and stores the associated file IDs in hash-files relationships 602 as shown in FIG. 6B. These hash-files relationships 602 allow for the efficient recovery of all file IDs that have the hashed line present therein. For example, a hash with hash value Hash1 might be indentified in a file with a file ID of File1ID and FileLID. Thus, in various embodiments, a program or analysis can find all hashed lines by file ID or all file ID by hash lines.

Figure 7:
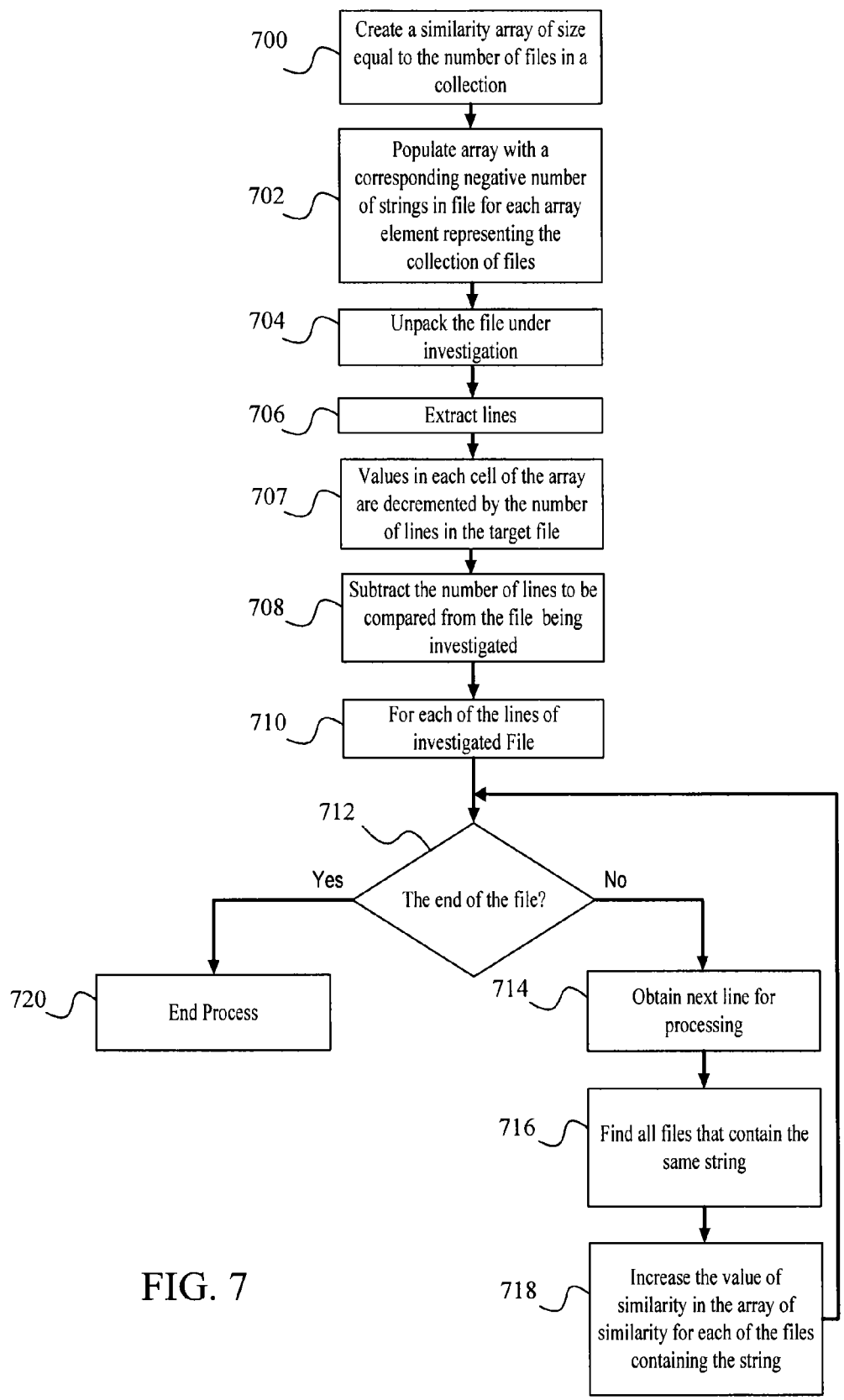
FIG. 7 is a flow chart representing the process of a determining similarity according to one embodiment.

Now referring to FIGS. 7 and 8, embodiments of performing the comparison are described. After the databases containing identified file information are created in the preprocessing phase, the process of searching for and determining similarity can be performed. In various embodiments, searching for and identifying similar files may be performed by a stand-alone computer system, or by an application server, client computer, or other computer having a memory capable of storing file information and a processor capable of line-by-line file analysis.

A new array is created with a size equivalent to the number of files present in a known database or collection of files to be searched for similarity at process block 700. The collection may be the database of known malicious files. After completion of the search or identification, this array will represent the similarity values of each file in the collection to a target file presented for search or comparison. The array is then populated with negative values corresponding to the number of lines present in each of the files of the collection of files, as indicated at process block 702 in order to prepare a first part of the baseline values. Next, the target file or file under investigation may be unpacked or decompressed at process block 704. The line-by-line extraction or preprocessing is performed at process block 706. The values in each cell of the array are further decremented by the number of lines in the file under investigation to be used for comparison 707. Each cell of the array is now populated with a baseline value equal to the negative value of the sum of the lines in the file being investigated and the corresponding file of the collection against which the file being investigated will be compared. This is the value of maximum dissimilarity for each file comparison.

The determination of similarity is generated when each extracted line is compared against the identified file collection at process block 710. For instance, a line from the target file may have a hash value of Hash1. By utilizing the hash-file described above, the identified files that contain the same line corresponding to the hash value Hash1 as in the target file can be identified quickly. Thus, the line comparison 710 proceeds to obtain each next line at process block 714 (assuming decision 712 determines that there is at least one more line remaining in the file) and finds all the files in the collection that have the same line by looking at the database or collection of identified files at process block 716. In the case where a file in the collection or database of identified files has the same line (i.e. equal hash value), the corresponding array value for that file is incremented at process block 718. In accordance with equation (1), the value in the array element would be incremented by three for each line found to be the same. Upon completion, the line comparison process block 710 returns and checks whether the end of the file has been reached at decision 712, if not, the next line is accessed at process block 714 and the process continues. If the end of file has been reached the check at decision 712 will signal the end of the process, as indicated at block 720.

At the end of the process detailed in FIG. 7, the new array is populated with the similarity values of the target file compared to the identified files in the database or collection. This process is efficient in that the number of operations required equals the sum total of the popularity of the target file lines found in the database. For example if the target file has three lines found respectively in 1000 files, 10 files, and 100 files in the collection, the number of operations performed in the line comparison process block 710 of FIG. 7 would be 1000+10+100=1110 operations. Further, the more positive the values in the array, the more similar the target file is to the file in the database. If the array stores a negative value, the files are not similar, while the positive values indicate that the target file is similar to the identified file in the database associated with that array index.

Figure 8A:
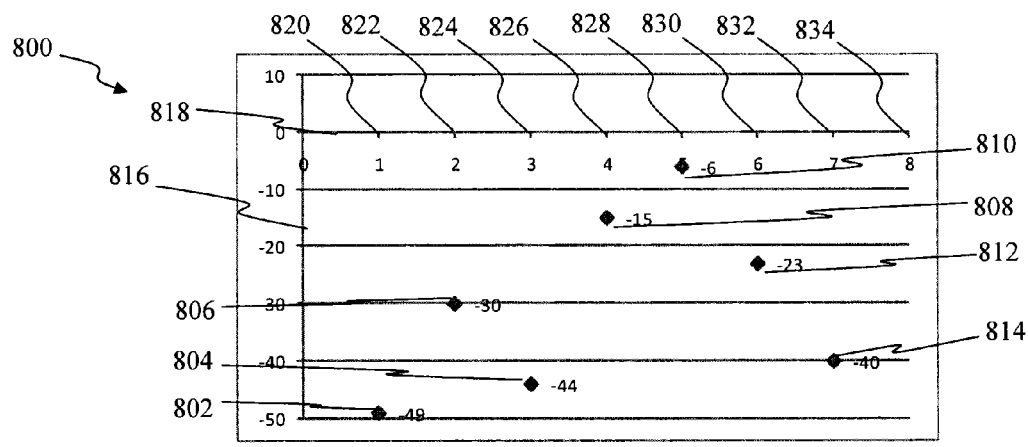
FIGS. 8A-8C are graphical depictions of similarity scores according to various embodiments.
Figure 8B:
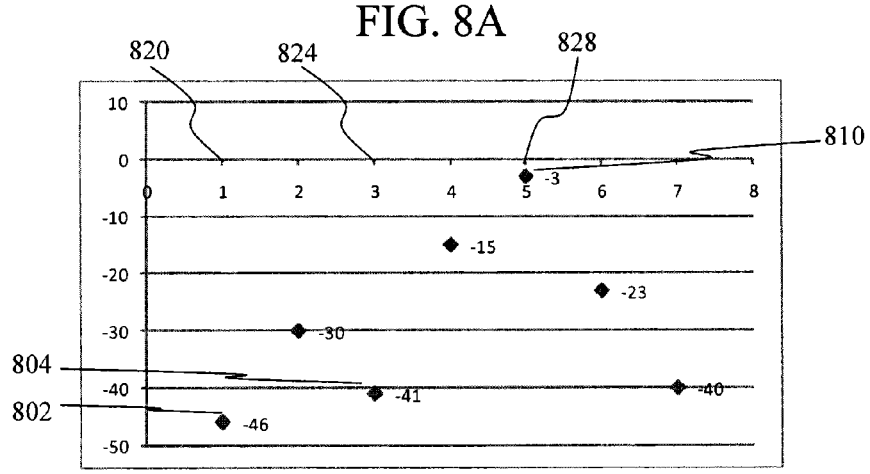
Figure 8C:
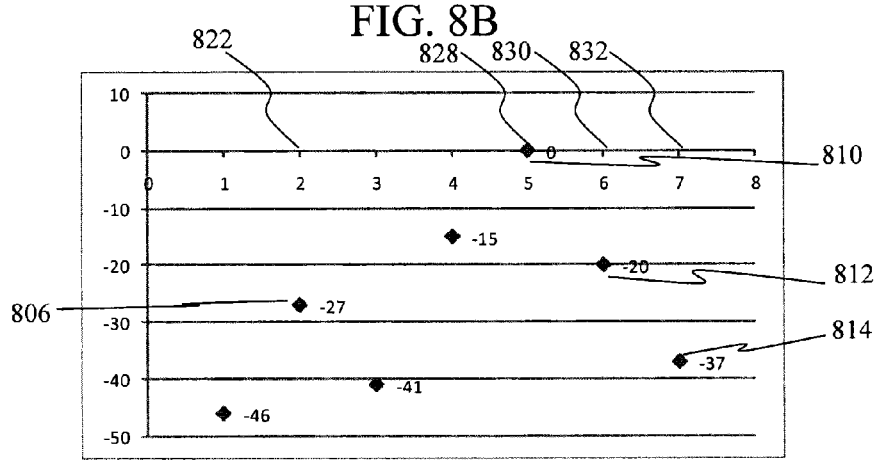

FIGS. 8A-8C provide a visual depiction of the values of the array as the process described above with reference to FIG. 7 is carried out to compare a target file against a database of seven known files. In FIGS. 8A-8C, each file of the collection of known files is represented along the horizontal axis, and the similarity score corresponding to each file is plotted vertically.

FIG. 8A illustrates example values 800 stored in the array initially. The similarity scores 802-814 provide a visual and numerical depiction of the measure of similarity (plotted in the direction of the y-axis 816) between the target file and the known files in the collection, each being represented on the x-axis 818 by tick marks 820-834. As a result of the initial value setting in FIG. 8A, there are varying degrees of similarity between the target file and the files of the collection.

As the process continues at process block 714, a new line from the target file is obtained and compared against the array of known files at process block 716. The result of this comparison may result in additional increments of the values stored in the array. An example of this process is shown in FIGS. 8B and 8C where additional iterations of the process blocks 714-718 result in the more positive similarity values stored in 828 and 832, indicating an increased degree of similarity.

Specifically, in one embodiment, a new line was obtained in 714 and compared against the collection of known files 716, in this embodiment, the collection was a hash-file structure containing all known files. The process queries the hash-file to find all entries in the hash-file that contain the same line as the one being compared. In this embodiment, the iteration producing the result illustrated in FIG. 8B results in the hash-file query returning, for example, FileID1, FileID3 and FileID5. These files are represented in the array as index 1, 3 and 5 respectively 820, 824, 828. The process block 718 increments the associated values. FIG. 8C illustrates the result of an additional line comparison where the hash-file query returned, for example, FileID2, FileID5, FileID6, FileID7 or array index 2,5,6 and 7 (reference numerals 822, 828, 830, and 832). As a result, the values stored in the array are incremented again to reflect the finding of a similar line in the known files.

In various embodiments, the process blocks 712-718 continue until a similarity threshold has been reached. For example, as shown in FIG. 8C a similarity threshold value of 0 has been set and the file represented by index 5, shown as reference numeral 828, has reached the value of 0 after completion of the iteration. Thus, in one example embodiment utilizing a threshold value, the process terminates and the file represented by index 5 828 would be determined to be the file under investigation. Embodiments utilizing a similarity threshold may require fewer iterations in determining similarity, thus reducing processing time and increasing overall computing performance. Further, in various related embodiments, the similarity threshold may be variable based on the size of the target file, type of target file or other information returned from the preprocessing of the target file.

In other embodiments, the process continues until all lines of the target file being investigated are checked. This requires more iterations, but produces a final measure of similarity between the target file and each of the files of the collection.

It should be noted that numerous variations to the counting system of equation (1) are possible and within the spirit of the invention. For example, in other related embodiments, process block 718 utilizes a weighting system in increasing the value of similarity in the array. The weighting system may account for factors suggesting stronger similarity by increasing the measure of similarity in the array, and may in some instances account for factors suggesting weaker similarity by decreasing the measure of similarity reported after each iteration. For example, factors suggesting greater overall file similarity include, without limitation, consecutive similar lines, a number of similar lines within a predefined proximity to one another, the number of similar lines within a predefined range, and the like. A variety of other factors can be utilized for weighting.

As another example, in one embodiment, a consecutive line weighting system is utilized in which an additional counter variable is maintained in process block 718 to record the number of consecutive similar lines. Then, as process blocks 714-718 are repeated in a subsequent iteration, for each line that is similar, the counter variable is checked and if it is non-zero, a weight is applied to the baseline similarity value stored in the array. In other embodiments, counter variables are stored in a weight array or the array created in process block 700 may be multi-dimensional to enable storing of the weighting values.

Figure 9:
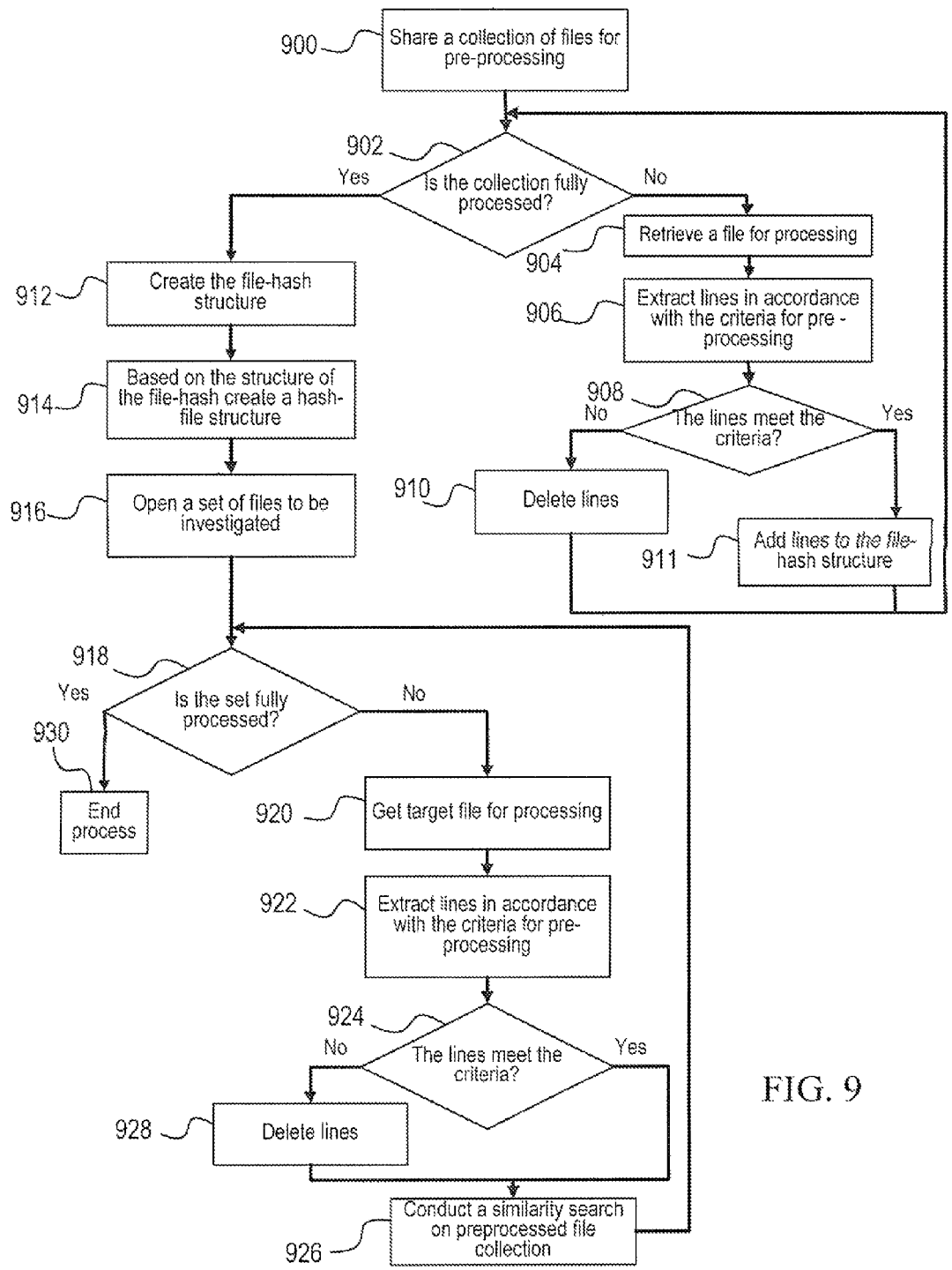
FIG. 9 is a flow diagram representing the process of a determining similarity according to another embodiment.

Now referring to FIG. 9, another phased matching process of line-by-line comparison according to one type of embodiment is presented. The process takes a shared set of files 900 and determines whether the collection has been preprocessed at process block 902. If not, the process selects the first file from the collection at 904 and performs the preprocessing stage as defined above at 906. The preprocessing stage performed at 906 includes the determination of whether the extracted lines from the file meet the extraction criteria at 908. If not the lines are deleted or ignored at 910; otherwise they are retained in the file in the collection and added to the file-hash structure at 911 and the next file is examined at process block 902. If the collection of files has been processed at 902, each entry in the collection of files contains only the lines that meet the preprocessing criteria and a file-hash structure is created at block 912 for each entry in the collection. Based on the created file-hash structure created at 912 a hash-file structure is created at 914. Upon completion of the creation of the hash-file structure, the collection of files is processed and is ready for target file comparisons. As mentioned above, this collection may be stored in a memory, such as a database, collection object, array, linked list or other known storage structure, either locally on a single computer system, or distributed among a plurality of communicatively-coupled computer systems.

In this embodiment, a set or collection of target files opened at process block 916 may be compared to the collection of processed files and the associated hash-file created at process block 914. For the set of files being processed, the technique will first determine if all processing is complete on the set of target files at process block 918. If not, the process will select a file from the set for processing at 920. The selected file will have the functional lines extracted from it according to the preprocessing rules described above, as indicated at block 922. This extraction process includes the determination of whether the lines meet the extraction criteria at decision block 924. If so, the extracted lines are compared at 926 to the hash structure of the known collection of files created at process block 914. If not, the lines are deleted at 928. The comparison process block 926 can be similar to the process presented in FIG. 7, where a determination of the similarity of the file compared to a known database or collection of files is determined. The process returns to check whether all files of the set or collection of target files have been processed at decision block 918, and the process continues with the other files in the set. If all files have been processed the processing check at 918 will proceed to end the routine at 930.

A person having skill in the art will appreciate that the various embodiments disclosed herein, while targeted to anti-virus and security, may be utilized to determine the similarity between any file that is able to be parsed line-by-line. Thus, the embodiment disclosed in FIG. 9 may be utilized to determine the similarity between two collections of files. Further, in various embodiments, the database or collection of identified files and the target file may be identified files stored in a database or memory but their similarity unknown and undetermined. In this way the various embodiments disclosed herein may be utilized to determine the similarity of versions of a file, or a set or derivative files. In addition, a person having skill in the art will appreciate that by utilizing the system and method of efficient and accurate line by line comparison of files described herein, the process of identifying malicious files is faster, and requires fewer resources than other processes known in the art.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 212, sixth paragraph of 35 U.S.C. are not to be invoked unless the specific terms "means for" or "step for" are recited in a claim.

What is claimed is:

1. A machine-implemented process for performing a functionality comparison between a target item of software code and a reference set of at least one reference item of software code, wherein each of the target item and reference item comprises a series of individual software code instructions that are arranged in a line-by-line fashion, the process comprising:

preprocessing, by a data processing machine, the target item, including automatically analyzing the target item for a presence of any lines of software code that tend to reduce sensitivity of the comparison, and selecting a resulting set of lines of software code from a remaining portion of the target item to be used for the comparison, wherein each line of the resulting set of lines represents a certain element of functionality of the software code, and wherein each line is defined as a series of consecutive data symbols having a starting point and a termination point; and comparing individually, by a data processing machine, each of the resulting relevant set of lines from the target software item with lines of software code from the reference set, in said line-by-line fashion, to produce a measure of similarity of functionality between the target software item and at least one reference item of software code from the reference set.

2. The machine-implemented process of claim 1, wherein preprocessing the target item further comprises separately compressing each line of the resulting set of lines selected from the target software item using a compression algorithm to produce a compressed set of lines from the target item of software; and wherein comparing each of the set of lines from the target software item with lines of software code from the reference set includes separately comparing each of the compressed set of lines from the target item with compressed lines of software code from the reference set, the compressed lines of software code from the reference set having been compressed using the compression algorithm used in the preprocessing of the target item.

3. The machine-implemented process of claim 2, wherein the compression algorithm is a hashing algorithm.

4. The machine-implemented process of claim 1, further comprising:

preprocessing, by a data processing machine, the reference set, including automatically analyzing each of the at least one reference item for a presence of any lines of software code that tend to reduce sensitivity of the comparison, and selecting a resulting set of lines of software code from a remaining portion of each reference item to be used for the comparison.

5. The machine-implemented process of claim 1, further comprising utilizing the measure of similarity to detect a presence of malware code in the target item of software code.

6. The machine-implemented process of claim 5, wherein each of the at least one reference item of software code is a known item of software code selected from the group consisting of: software code that has been determined to be free from any malware infection, and software code that is infected with malware code.

7. The machine-implemented process of claim 1, wherein the target item of software is a file, and wherein each of the reference items of the reference set is a file.

8. The machine-implemented process of claim 1, wherein the preprocessing of the target item includes parsing the target item to identify the lines of code.

9. The machine-implemented process of claim 1, wherein the preprocessing of the target item includes truncating the target item at the beginning or at the end of a portable executable portion of code.

10. The machine-implemented process of claim 1, wherein the analyzing of the target item for a presence of any lines of software code that tend to reduce sensitivity of the comparison includes distinguishing between lines of code that directly establish functionality of the target item and lines of code and that do not directly establish said functionality.

11. The machine-implemented process of claim 1, wherein the comparing further includes selecting, as a secondary set of lines to be used for the comparison, at least a portion of the lines of software code from the target software item that tend to reduce sensitivity of the comparison; and wherein the comparing further includes comparing each of the secondary set of lines from the target software item with lines of software code from the reference set.

12. The machine-implemented process of claim 1, further comprising:

generating, by a data processing machine, a data structure having elements corresponding to each reference item of the reference set; and storing a numerical representation of similarity of the target item with each reference item in a corresponding element of the data structure.

13. The machine-implemented process of claim 12, wherein the comparing is performed such that, in response to comparing each individual line from the target item with lines of software code from the reference set, the numerical representation of similarity that is stored in each element of the data structure, corresponding to the reference item against which the line from the target item is compared, is updated to reflect a presence or absence of that individual line in the corresponding reference item.

14. A non-transitory computer-readable storage medium comprising:

instructions that, when executed by a computer system, cause the computer system to perform a comparison between a target item of software code and a reference item of software code, wherein each of the target item and reference item comprises a series of individual software code instructions that are arranged in a line-by-line fashion, such that the computer system:

preprocesses a target item to be compared against a reference software item such that the target item is analyzed for a presence of any lines of software code that tend to reduce sensitivity of the comparison, and select a resulting set of lines of software code from a remaining portion of the target item to be used for the comparison, wherein each line of the resulting set of lines represents a certain element of functionality of the software code, and wherein each line is defined as a series of consecutive data symbols having a starting point and a termination point; and individually compares each of the resulting set of lines from the target software item with lines of software code from the reference set, in said line-by-line fashion, to produce a measure of similarity of functionality between the target software item and at least one reference item of software code from the reference set.

15. An apparatus for performing a comparison between a target item of software code and a reference set of at least one reference item of software code, wherein each of the target item and reference item comprises a series of individual software code instructions that are arranged in a line-by-line fashion, the apparatus comprising:

a computer system including at least one processor and a data store, the computer system including:

a preprocessing module adapted to preprocess the target item to be compared against a reference item from the reference set to identify a selected set of lines of software code from the target item to be used for the comparison, wherein each line of the selected set of lines represents a certain element of functionality of the software code, and wherein each line is defined as a series of consecutive data symbols having a starting point and a termination point;

a comparison module adapted to individually compare each line of the selected set of lines from the target software item with lines of software code from the reference set, in said line-by-line fashion, to produce a measure of similarity of functionality between the target software item and at least one reference item of software code from the reference set; and an output data store adapted to store a data structure having elements corresponding to each reference item of the reference set, wherein a numerical representation of similarity of the target item with each reference item is stored in a corresponding element of the data structure.

16. The Apparatus of claim 15, wherein the comparison module is adapted to operate such that, in response to comparing each individual line from the target item with lines of software code from the reference set, the numerical representation of similarity that is stored in each element of the data structure corresponding to the reference item against which the line from the target item is compared, is updated to reflect a presence or absence of that individual line in the corresponding reference item.

17. The Apparatus of claim 15, wherein the preprocessing module is further adapted to separately compress each of the selected set of lines of software code using a compression algorithm to produce a compressed set of lines from the target item of software; and wherein the comparison module is further adapted to separately compare each of the compressed set of lines with compressed lines of software code from the reference set, the compressed lines of software code from the reference set having been compressed using the compression algorithm that was used by the preprocessing module to preprocess the target item.

18. The Apparatus of claim 15, wherein each of the at least one reference item of software code is a known file containing software code that has been determined to be free from any malware infection.

19. The Apparatus of claim 15, wherein the preprocessing module is further adapted to analyze the target item for a presence of any lines of software code that tend to reduce sensitivity of the comparison.

20. The Apparatus of claim 19, wherein the preprocessing module is adapted to distinguish between lines of code that directly establish functionality of the target item and lines of code and that do not directly establish said functionality.

* * * * *